(12) United States Patent
Tsuboi et al.

(10) Patent No.: US 7,351,341 B2
(45) Date of Patent: Apr. 1, 2008

(54) DESCALING METHOD AND DESCALING APPARATUS

(75) Inventors: Kiyoshi Tsuboi, Tokyo (JP); Hajime Yuasa, Tokyo (JP); Tsuneo Sugawara, Tokyo (JP)

(73) Assignees: Royal Kiki Co., Ltd., Tokyo (JP); Measurement Technical Laboratory Co., Ltd., Tokyo (JP)

( * ) Notice: Subject to any disclaimer, the term of this patent is extended or adjusted under 35 U.S.C. 154(b) by 429 days.

(21) Appl. No.: 10/513,152

(22) PCT Filed: May 8, 2003

(86) PCT No.: PCT/JP03/05758

§ 371 (c)(1),
(2), (4) Date: Nov. 2, 2004

(87) PCT Pub. No.: WO03/095704

PCT Pub. Date: Nov. 20, 2003

(65) Prior Publication Data

US 2005/0161379 A1      Jul. 28, 2005

(30) Foreign Application Priority Data

May 13, 2002    (JP) .............................. 2002-136789

(51) Int. Cl.
*C02F 1/48* (2006.01)

(52) U.S. Cl. ...................... 210/695; 210/222; 210/243; 210/748; 204/155; 204/557; 204/660; 204/664

(58) Field of Classification Search ................ 210/222, 210/243, 695, 748; 204/155, 557, 660, 664
See application file for complete search history.

(56) References Cited

U.S. PATENT DOCUMENTS 5,738,766 A * 4/1998 Jefferson .................... 210/222

FOREIGN PATENT DOCUMENTS

JP          A 9-316700          12/1997

* cited by examiner

*Primary Examiner*—David A Reifsnyder
(74) *Attorney, Agent, or Firm*—Oliff & Berridge, PLC

(57) ABSTRACT

This invention is to provide a method of efficiently removing scales adhered to a pipe and the like. A descaled object with scales deposited thereto is covered with a solvent at least on its scaled surface. A magnetic field is generated by supply a frequency signal to a coil, and the descaled object and the solvent are disposed within this magnetic field. Signals having frequencies that are set beforehand at every scale are supplied to the coils as the frequency signals. The frequencies of the frequency signals supplied to the coils and which are set beforehand are frequencies required when an electric current flows through the solvent which covers the scales.

21 Claims, 14 Drawing Sheets

Background Art

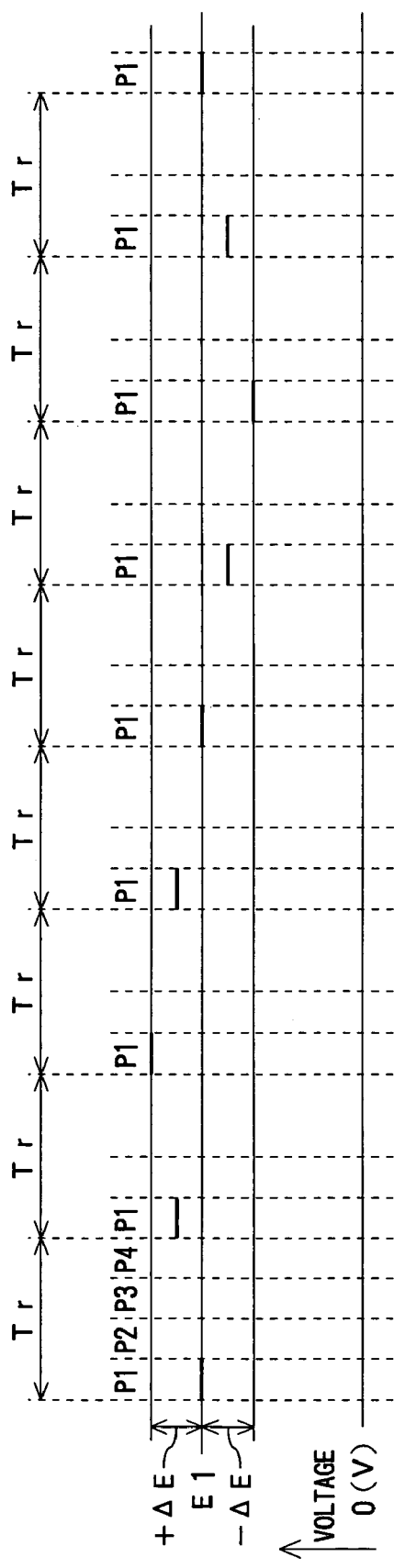

FIG. 15

| | P1 | P2 | P3 | P4 | P1 | P2 | P3 | P4 | P1 | P2 | P3 | P4 | P1 | P2 | P3 | P4 |
|---|---|---|---|---|---|---|---|---|---|---|---|---|---|---|---|---|
| (A) | Ea | Ea | Ea | Ea | Ea | Ea | Ea | Ea | Ea | Ea | Ea | Ea | Ea | Ea | Ea | Ea |
| (B) | fa | fa | fa | fa | fa | fa | fa | fa | fa | fa | fa | fa | fa | fa | fa | fa |
| (C) | Ea | Ea | Eb | Eb | Ea | Ea | Eb | Eb | Ea | Ea | Eb | Eb | Ea | Ea | Eb | Eb |
| (D) | fa | fa | fb | fb | fa | fa | fb | fb | fa | fa | fb | fb | fa | fa | fb | fb |
| (E) | Ea | Ea | Ea | Eb | Ea | Ea | Ea | Eb | Ea | Ea | Ea | Eb | Ea | Ea | Ea | Eb |
| (F) | fa | fa | fa | fb | fa | fa | fa | fb | fa | fa | fa | fb | fa | fa | fa | fb |
| (G) | Ea | Eb | Ec | | Ea | Eb | Ec | | Ea | Eb | Ec | | Ea | Eb | Ec | |
| (H) | fa | fb | fc | | fa | fb | fc | | fa | fb | fc | | fa | fb | fc | |
| (I) | Ea | Eb | Ec | Ec | Ea | Eb | Ec | Ec | Ea | Eb | Ec | Ec | Ea | Eb | Ec | Ec |
| (J) | fa | fb | fc | fc | fa | fb | fc | fc | fa | fb | fc | fc | fa | fb | fc | fc |
| (K) | Ea | Eb | Ec | Ed | Ea | Eb | Ec | Ed | Ea | Eb | Ec | Ed | Ea | Eb | Ec | Ed |
| (L) | fa | fb | fc | fd | fa | fb | fc | fd | fa | fb | fc | fd | fa | fb | fc | fd |

The columns are grouped into periods of Tr, each containing P1, P2, P3, P4.

DESCALING METHOD AND DESCALING APPARATUS

TECHNICAL FIELD

This invention relates to a method of and apparatus for removing scale such as calcium carbonate and iron rust (so-called red rust) deposited on a pipe and so on, for example.

BACKGROUND ART

There is known a method of removing scale by magnetic treatment water. For example, a report made under the title of "Substantiation experiments for preventing adhesion of marine organisms to the hull and the engine plant by magnetic treatment water" has been made so far in pp. 9 to 12 of "Collection of Papers of 50$^{th}$ Scientific Lecture Meeting of Tokyo University of Mercantile Marine published on Feb. 20, 2002 by Tokyo University of Mercantile Marine".

According to the above-described report, a sea water magnetic treatment experiment uses a sea water magnetic treatment apparatus shown in FIG. 1. Specifically, an insulated electric wire 2 is wound around part of a pipe 1 as a treatment object using for sea water system by several turns to form a coil, and a weak electric current with a frequency ranging of from 5000 to 20000 Hz generated from a pulse generator 3 flows through the electric wire 2 to form a magnetic field that generates magnetic flux shown dashed lines in FIG. 1. In other words, the frequency of the weak electric current supplied to the electric wire 2 is swept in a range of from 5000 Hz to 20000 Hz.

According to the above-described report, water that flows through the pipe 1 in the direction shown by an arrow 4 is electrified, and the electrified water flows through the pipe 1 to prevent adhesion of scale, which marine organisms prefer to travel on, onto the inside surface of the pipe 1, and hence marine organisms can be prevented from adhering onto the local areas of the hull.

Moreover, as an apparatus using magnetic treatment water of the same kind, there is known an apparatus called "SCALE WATCHER" (registered trademark). This apparatus has an arrangement equivalent to that shown in FIG. 1 and an electric current that flows through the electric wire 2 is changed in a wide frequency extent ranging from 500 Hz to 3 kHz.

Of the above-described conventional technologies, the former report has described that while the frequency is being changed within the aforementioned frequency range, the electric current flows through the electric wire 2 to form the magnetic field to electrify water that flows through the pipe 1 and the thus electrified water flows through the pipe 1 to prevent adhesion of scale, which the marine organisms prefer to travel on, onto the inside surface of the pipe 1.

According to the description of the latter case, magnetic field energy and electric field energy (eddy current) generated by frequency-modulation are both used to progressively and physically change shapes and sizes of calcified calcium and minerals to decrease adhesion force of scale to thereby let scale flow from the inside of the pipe to the water.

In any case, although the basis for an argument is not yet established from a theory standpoint, according to the above-mentioned conventional apparatus, it was confirmed that the descaling effect is achieved when the electric current is flowing to the magnetic field generation coil wound around the pipe 1 while the predetermined frequency range is being searched for, and hence the above-mentioned conventional apparatuses do not intend to aim and remove specific scale.

Therefore, even if the above-mentioned conventional apparatuses are used for intending to aim and remove only specific scale, for example, since they do not intended to specify and remove only such specified scale, it is considered that the descaling effect should encounter with large energy loss. As a result, even if it is confirmed that the descaling effect is achieved through the above-mentioned conventional apparatuses, it is unavoidable that this descaling effect is achieved with plenty of time, and a problem arises, in which the above-mentioned descaling effect should not be efficient.

An object of this invention is to provide a descaling method and a descaling apparatus by which specific scale can be aimed and hence scales can be removed efficiently.

DISCLOSURE OF INVENTION

The inventors of this invention have confirmed the following descaling effect. That is, when a descaled object with a specific scale adhesion is placed in a solvent, e.g. water with application of a magnetic field generated by supplying a frequency signal to a coil and a frequency of the frequency signal supplied to the coil is changed, an electric current possible for detecting suddenly flows through the solvent at a specific frequency corresponding to each scale to promote action in which a scale is removed from the descaled object and suspended in the solvent.

For example, FIG. 2 is a diagram showing measured a value of an electric current in the water obtained when a frequency of a frequency signal supplied to a coil was changed in the state in which a descaled object with scale mainly composed of calcium was placed in the water with application of a magnetic field formed by supplying the frequency signal to the coil. At that time, the frequency signal supplied to the coil is a signal waving in a range of from +10V to −10V, and a load resistance was 50 Ω. From FIG. 2, it can be confirmed that an electric current possible for detecting suddenly flows through the water when the frequency signal supplied to the coil has a frequency of about 35 kHz.

FIG. 3 is a diagram showing measured a value of an electric current in the water obtained when a frequency of a frequency signal supplied to a coil was changed under the same condition and in the state in which a descaled object with the scale mainly composed of magnesium was placed in the water with application of a magnetic field formed by supplying the frequency signal to the coil. From FIG. 3, it can be confirmed that an electric current possible for detecting flows suddenly through the water when the frequency signal supplied to the coil has a frequency of about 60 kHz.

This action can be inferred as follows: Specifically, since the solvent e.g. water in which the descaled object was placed, contains scale (electrolyte) as impurities, the solvent contains free electrons that can move in the free direction. Thus, when these electrons are placed with application of a magnetic field formed by supplying the frequency signal to the coil, they are vibrated with application of Lorentz force corresponding to the magnetic field and collide with the scale (e.g. oxide of specific element).

More specifically, when a point electric charge is brought into a space on which a magnetic field acts, if the point electric charge does not move, then the electric charge is not influenced at all. If the point electric charge moves, force F is applied to the point electric charge from the magnetic field. When a point electric charge q [C] is moving within the magnetic field at velocity V [m/s], as shown in FIG. 3, if a magnitude of the magnetic field is held at a magnetic flux density B [T] and an angle between the direction of the magnetic flux and the direction of the velocity V of the point electric charge is held at θ [rad], then the force F applied to the point electric charge from the magnetic field is oriented in the direction perpendicular to the plane including the magnetic flux direction of the magnetic flux density B and the direction in which the electric charge moves at the velocity V and this force is given as:

$$F = qVB \sin\theta \ [N] \qquad \text{(equation 1)}$$

This force F is the Lorentz force.

When the point electric charge with this Lorentz force applied thereto moves to cause the electric current to flow, an electric field E is generated and this electric field E acts on the point electric charge in addition to the magnetic field. The force that is applied to the point electric charge at that time is given as:

$$F = qE + qVB \sin\theta \ [N] \qquad \text{(equation 2)}$$

When the point electric charge with the thus generated Lorentz force applied thereto, i.e., electrons collide with scale, if energy higher than an ionization voltage of the above-described specific element is generated, then electrons are escaped from the specific element so that the element (atom) is ionized and dissolved into the water. As a result, it is considered that an electric current possible for detecting suddenly flows through the water.

Although a part of the element ions dissolved from the scale to the water as described above remain as they are, other element ions change to hydroxide of small particle. At that time, since the water is ionized, reduction action can prevent the hydroxide from further changing into oxide, and hence the hydroxide of small particle is suspended in the water. Accordingly, specific scale can be aimed and efficiently removed not by causing the electric current to flow through the magnetic field generation coil with changing the frequency the electric current within the predetermined frequency range as in the aforementioned conventional examples, but by supplying a specific frequency signal determined corresponding to a specific scale to a magnetic field generation coil.

A descaling method according to the present invention is based upon the results of the above-mentioned studies and comprises the steps of:

covering a descaled object at least on its scale adhesion surface side with a solvent;

supplying a frequency signal to a coil to form a magnetic field and applying this magnetic field to the descaled object and the solvent; and supplying a signal with a frequency set beforehand corresponding to a specific scale to the coil as the frequency signal.

According to this invention, since a signal with a specific frequency determined corresponding to type of a scale is supplied to the magnetic field generation coil, a specific scale can be aimed and efficiently removed.

If the frequency thus set beforehand of the frequency signal supplied to the coil is selected to be a frequency required when an electric current possible for detecting flows through the solvent covering the scale to be removed with application of the magnetic field formed by supplying the frequency signal to the coil, then the effect for aiming and removing the specific scale may be maximized.

It is customary that the ionization voltage is generated at a resonance frequency (frequency that differs at every element) higher than the frequency of ESR (Electron Spin Resonance). The frequency of this ESR is generally a very high frequency, and hence cannot be obtained without a very expensive oscillator.

However, the frequency that has been discovered in the studies made by the inventors of this invention is not such high frequency but is a practical frequency lower than the frequency of the ESR.

Therefore, according to this invention, the practical frequency that is lower than the frequency of the ESR can be supplied to the coil, and hence the expensive apparatus is not required.

The solvent may flow at an arbitrary velocity in the direction extending along the scale adhesion surface, and the magnetic field may be formed such that the magnetic flux crosses the direction in which the solvent flows.

Specifically, with this arrangement, the solvent may flow at an arbitrary velocity in the direction extending along the scale adhesion surface. Accordingly, as mentioned hereinbefore, the hydroxide of small particle being formed by element ions dissolved from the scale to the water suspending in the solvent may flow toward to the lower part.

At that time, part of the element ions (positive ions) that have been dissolved into the water remains and is formed as hydration ions, and running water let the hydration ions flow toward the lower part in which the magnetic field formed by the coil does not exist. Then, in the lower part, the element ions adsorb electrons from the elements in the scale, whereby the elements in the scale are ionized and dissolved into the water. Thereafter, similar actions to those described above are generated.

It is considered that the above-mentioned actions are also generated in the further lower part of running water and continued over a time period during which element ions are vanished (this time period may be considered to be equivalent to a half-life).

When the solvent moves in this manner, the direction in which the electrons move becomes substantially equal to the direction in which the solvent flows. At that time, when the direction of the magnetic flux density is equal to the direction in which the solvent flows, since an equality of θ=0 is satisfied, an equality of sin θ=0 is satisfied in the aforementioned equations (1) and (2) and the Lorentz force F becomes zero or reaches a very small value, which is not efficient.

However, with the above-mentioned arrangement, since the direction of the magnetic flux and the direction in which the solvent flows cross each other, the above-described angle θ does not become zero, and hence the effective Lorentz force acts on the electrons.

The frequency of the frequency signal supplied to the above-described coil may be changed within the predetermined frequency range around the frequency set beforehand at every scale.

As described above, when the frequency is changed within the predetermined frequency range around the set frequency, if an error occurs slightly in the effective frequency due to factors such as the change of temperature in the environment conditions in which the apparatus of the present invention is in use, then since the frequency is changed in the frequency range in consideration of the error amount and the frequency signal flows to the coil within the frequency range containing the reliable and effective frequency, it becomes possible to reliably and efficiently remove target scale.

While the removable of scale composed of the oxide of one element has been described so far, when a plurality of types of scales are to be removed, i.e., when a plurality of different scales are existing as the scales to be removed, a plurality of frequency signals set beforehand corresponding to respective scales of a plurality of different scales may be supplied to the coil in a time-division manner.

As will be understood from the descriptions about the aforementioned actions in the lower part, the element ions ionized by the electrons applied with the Lorentz force by the magnetic field are not vanished instantly but they may exist during a predetermined time period owing to hydration made by water molecule. As a result, magnetic fields generated by supplying the frequency signals set corresponding to the scale to the coil need not exist continuously. Thus, even when those magnetic fields exist during intermittent time periods, the similar descaling effect can be achieved.

Thus, when the signals with the frequencies corresponding to respective scales of a plurality of scales flow to the coil in a time-division manner, magnetic fields are generated by the respective frequency signals in a time-division manner, and hence the above-mentioned actions occurs in the respective scales so that respective scales can be removed at high efficiency. That is, there can be achieved a remarkable effect in which a plurality of scales can efficiently be removed substantially at the same time.

Moreover, if the length of each time-division period during which a corresponding frequency signal of a plurality of frequency signals is supplied to the coil is set corresponding to the scale component ratio of each scale among a plurality of scales to be removed, then a plurality of scales can be removed more efficiently.

Specifically, since the time-division interval during which the respective frequency signals of a plurality of frequency signals are supplied to the above-described coil can be varied in response to the scale component ratio of each scale among a plurality of scales to be removed, scales can efficiently be removed in response to the scale component ratios of a plurality of scales in the descaled object.

When it is intended to remove three kinds of scales of which the scale component ratio is 50%, 25%, 5%, for example, a time interval during which the frequency signals corresponding to the respective scales are supplied to the coil is set to 10:5:1, the three kinds of scales can be removed efficiently.

BRIEF DESCRIPTION OF DRAWINGS

FIGS. 13 to 15 are timing charts used to explain the frequency signal generating apparatus for use with the descaling apparatus according to the embodiment of this invention.

BEST MODE FOR CARRYING OUT THE INVENTION

An embodiment of a descaling apparatus to which a descaling method according to this invention is applied will be described with reference to the drawings.

Figure 1:
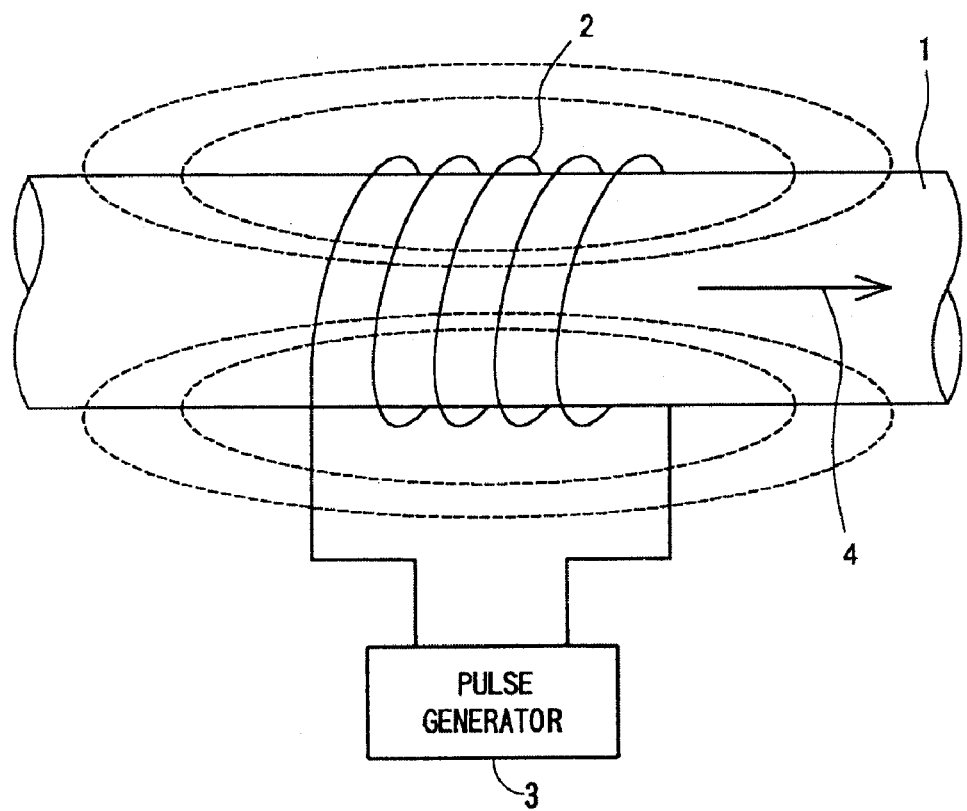
FIG. 1 is a diagram used to explain an example of a descaling apparatus according to the prior art.
Figure 2:
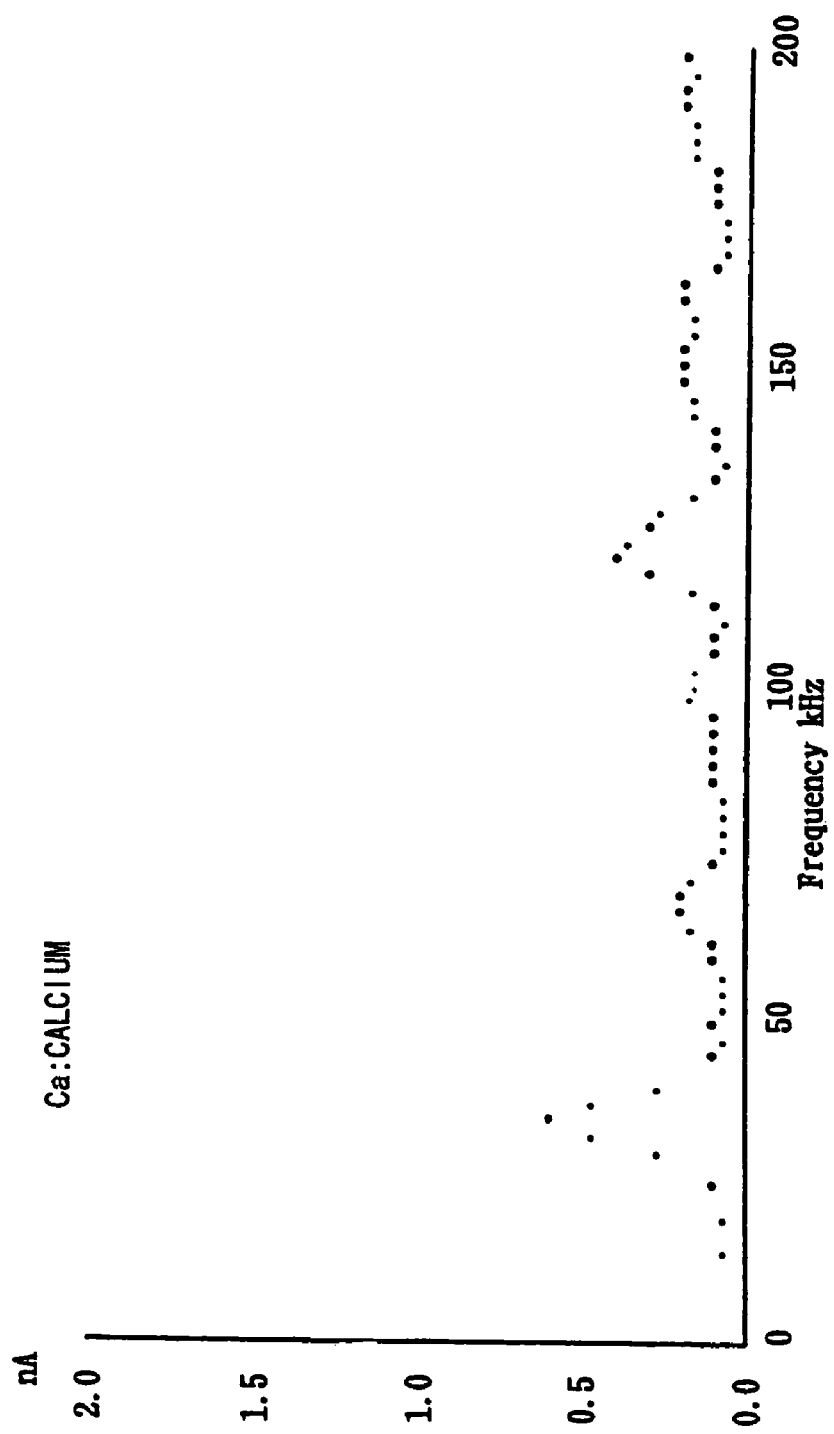
FIGS. 2 to 5 are diagrams used to explain a basis of a principle of a descaling method according to this invention.
Figure 3:
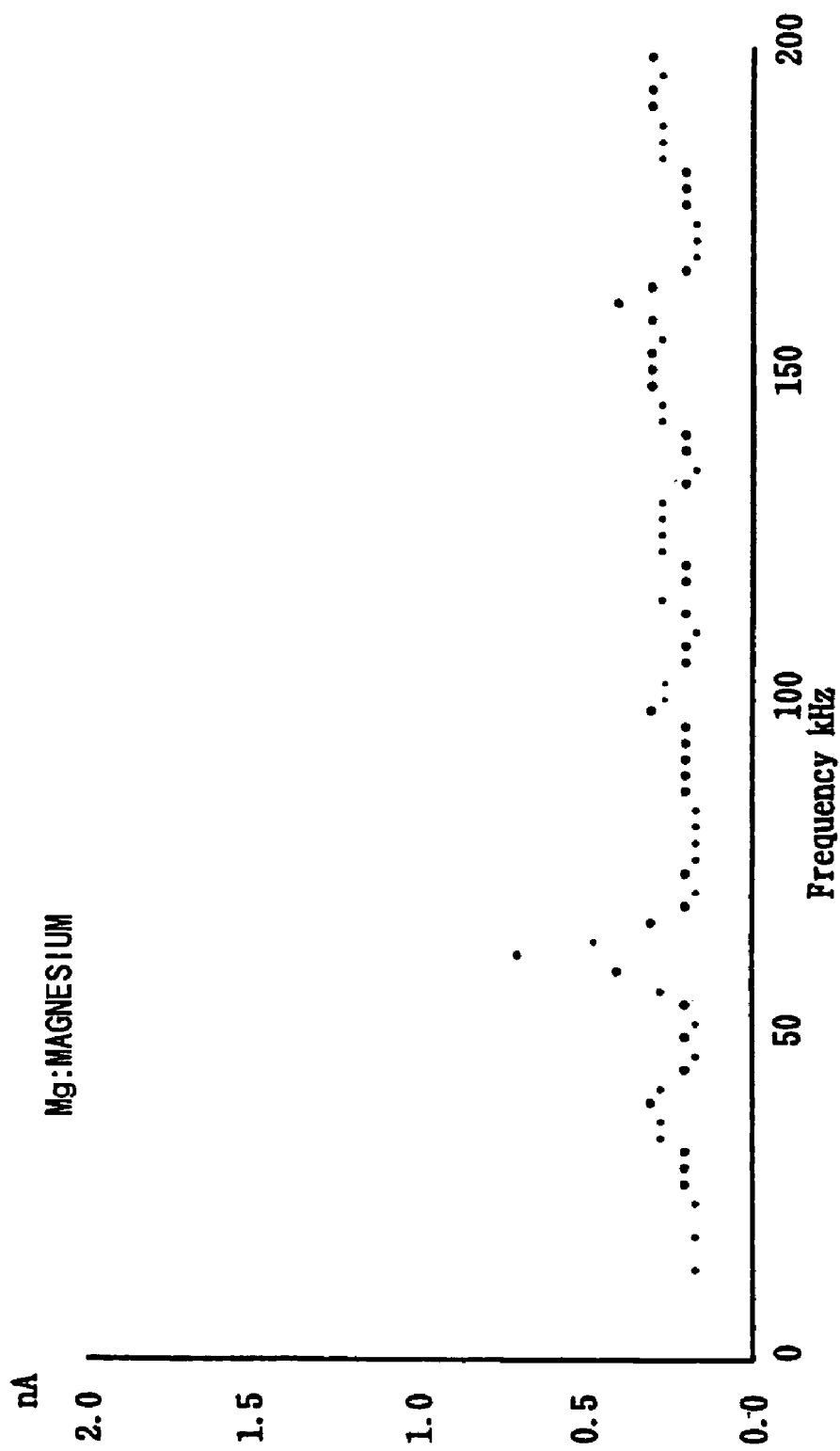
Figure 4:
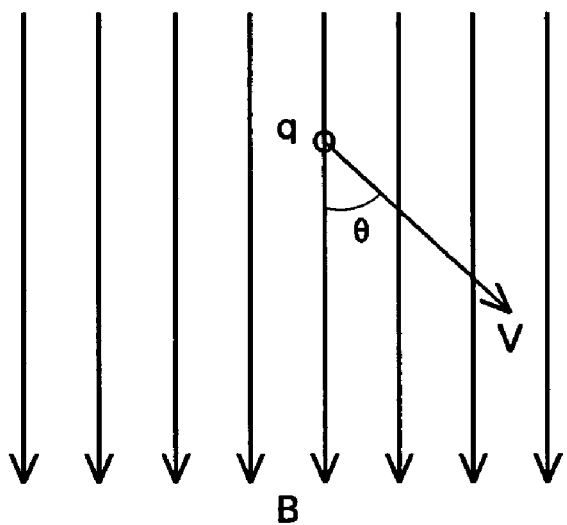
Figure 5:
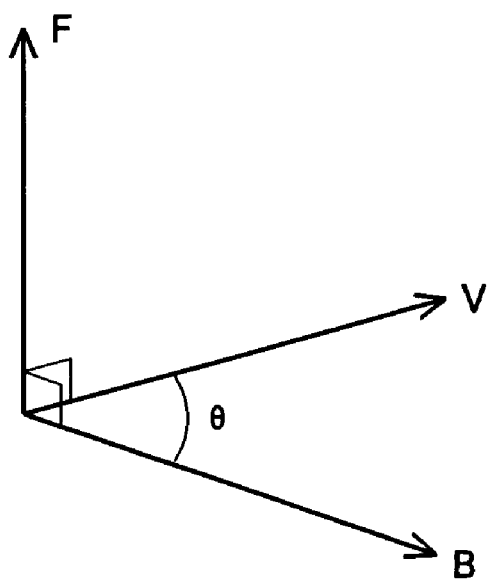
Figure 6:
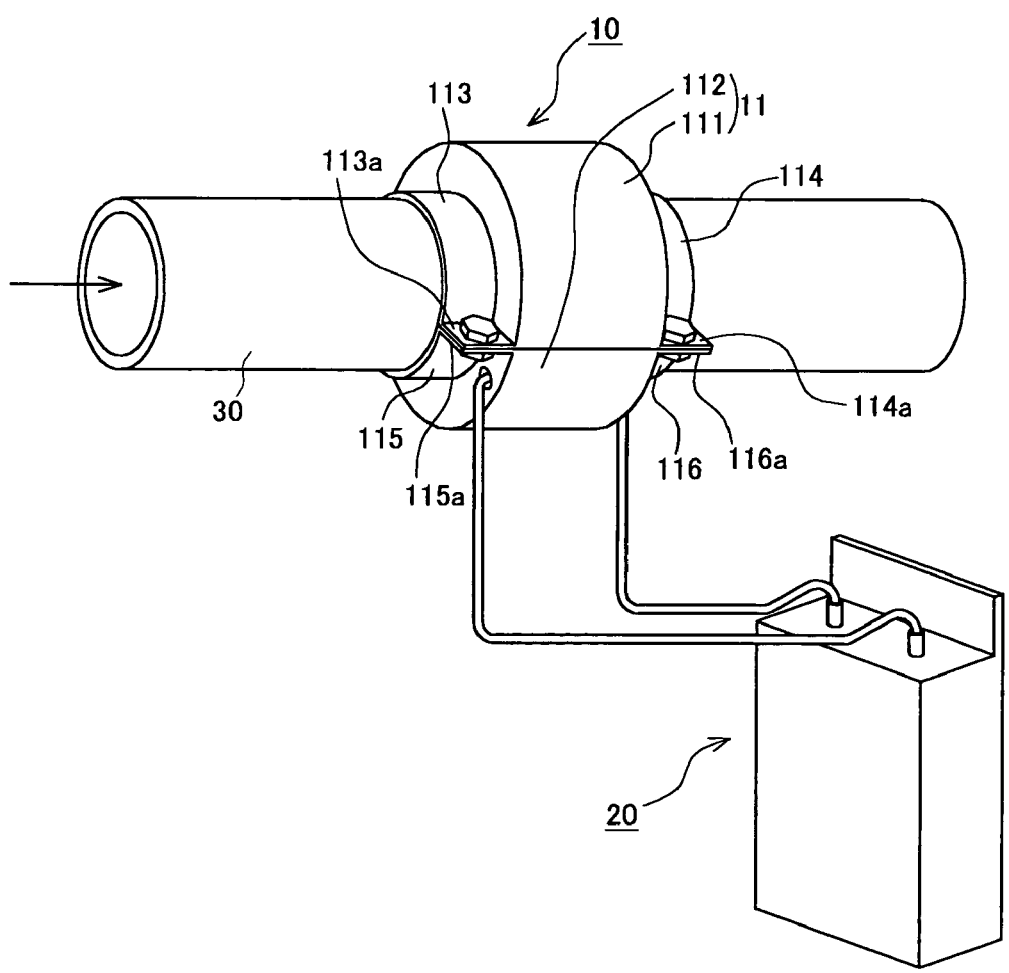
FIG. 6 is a diagram showing a descaling apparatus according to an embodiment of this invention.

FIG. 6 is a diagram used to explain a descaling apparatus according to an embodiment of this invention. This embodiment refers to an example of an apparatus having an arrangement in which a plurality of different scales deposited on the inner wall of a cylindrical pipe 30 can be removed simultaneously. While the number of scales that can be removed at the same time may be more than 30 kinds of scales, for example, according to this example, for simplicity, this example of the descaling apparatus will be described below on the assumption that scales of up to four kinds can be removed at the same time.

A descaling apparatus of this embodiment comprises a magnetic field generating apparatus 10 and a frequency signal generating apparatus 20 for generating frequency signals that are supplied to this magnetic field generating apparatus 10. The magnetic field generating apparatus 10 includes a cover made of a nonmagnetic material to which a plurality of magnetic field generating coils, which will be described later on, are attached. The frequency signal generating apparatus 20 generates frequency signals that are to be supplied to a plurality of magnetic field generating coils.

[Arrangement of Magnetic Field Generating Apparatus 10]

Figure 7:
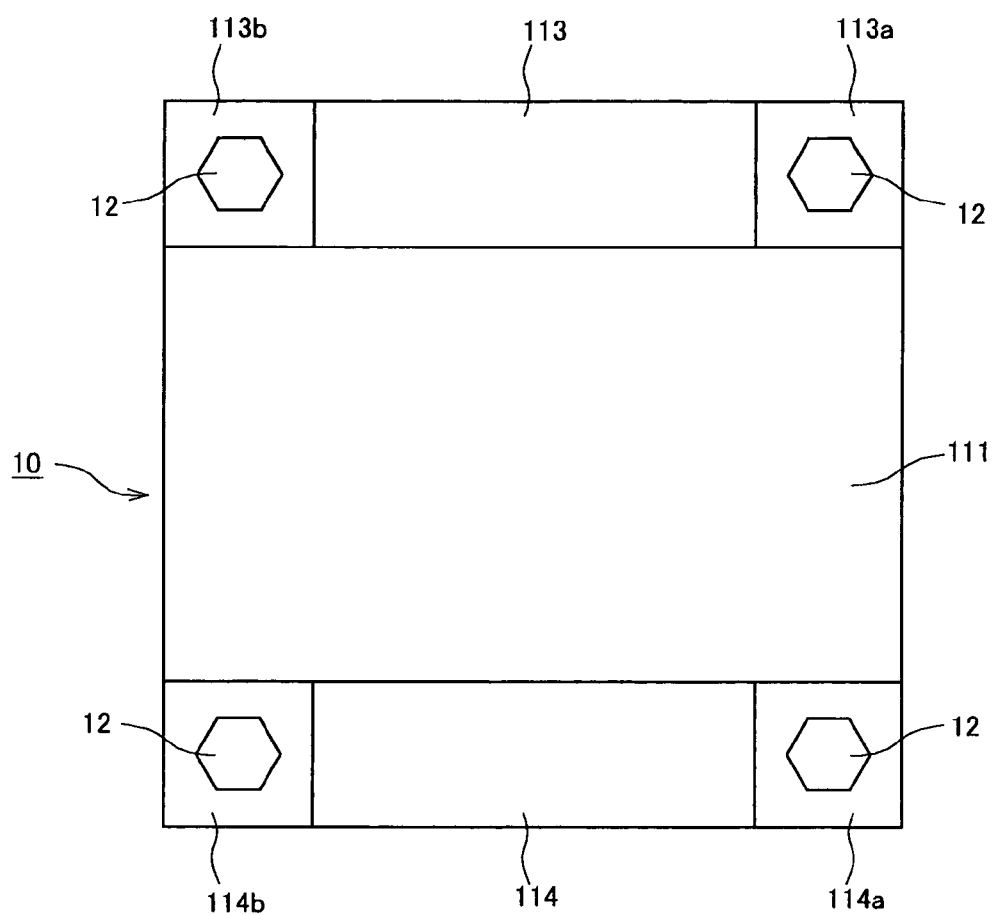
FIGS. 7 to 10 are diagrams useful for explaining a magnetic field generating apparatus for use with a descaling apparatus according to the embodiment of this invention.
Figure 8:
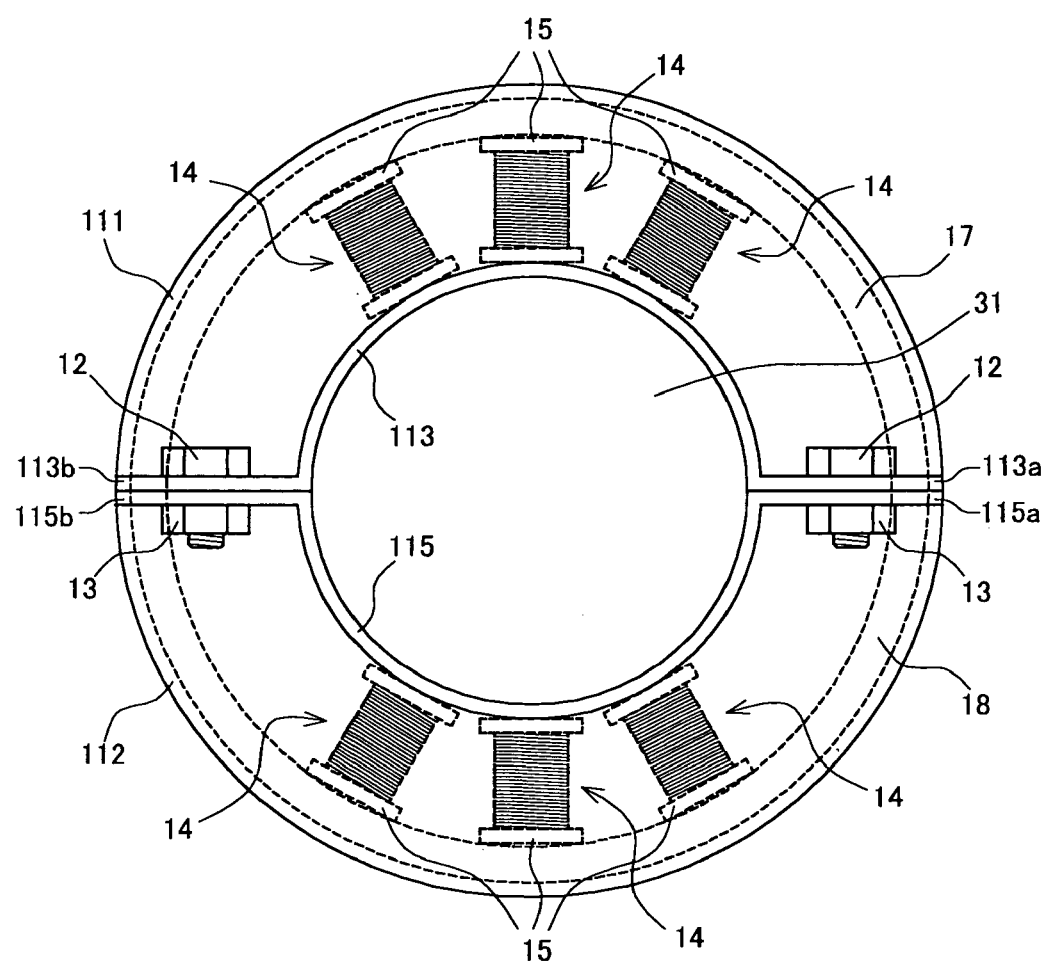

FIG. 7 is a diagram showing the magnetic field generating apparatus 10 from the side circumference direction, and FIG. 8 is a diagram showing the magnetic field generating apparatus 10 from the center line direction of the cylinder. A cover 11 of the magnetic field generating apparatus 10 comprises two half-circumference covers 111 and 112 with the shape cut along the plane containing the center line of the cylinder. The two half-circumference covers 111 and 112 are joined at the above-described cut plane to form a cylinder having a hollow portion 31 to allow the pipe 30 to be inserted therein. The half-circumference covers 111 and 112 are made of a nonmagnetic material.

As shown in FIGS. 6, 7 and 8, these two half-circumference covers 111 and 112 are provided with expanded portions 113, 114 and 115, 116 outwardly expanded from respective end faces of the cylinder along the direction parallel to the center line direction of the cylinder. These expanded portions 113, 114 and 115, 116 have joint plate portions 113$a$, 113$b$, 114$a$, 114$b$ and 115$a$, 115$b$, 116$a$, 116$b$ formed as one body and which are composed of flat surfaces parallel to the plane that cuts the cylinder with respect to the center line.

As illustrated, in the state in which the joint plate portions 113$a$, 115$a$, the joint plate portions 113$b$, 115$b$, the joint plate portions 114$a$, 116$a$, the joint plate portions 114$b$, 116$b$ are abutting against each other, they are joined by bolts 12 and nuts 13, whereby the magnetic generating apparatus 10 is attached to the pipe 30 as shown in FIG. 6.

Magnetic field generating coil units 14 are mounted on the insides of the half-circumference covers 111 and 112, respectively. Although one magnetic field generating coil unit 14 may be each mounted on the insides of the half-circumference covers 111 and 112, according to this embodiment, in order to generate magnetic fields in the pipe 30 as equally as possible, a plurality of magnetic field generating coil units, in this example, three magnetic field generating coil units 14 are respectively disposed on the insides of the half-circumference covers 111 and 112 along the circumference direction of the pipe 30.

Figure 9:
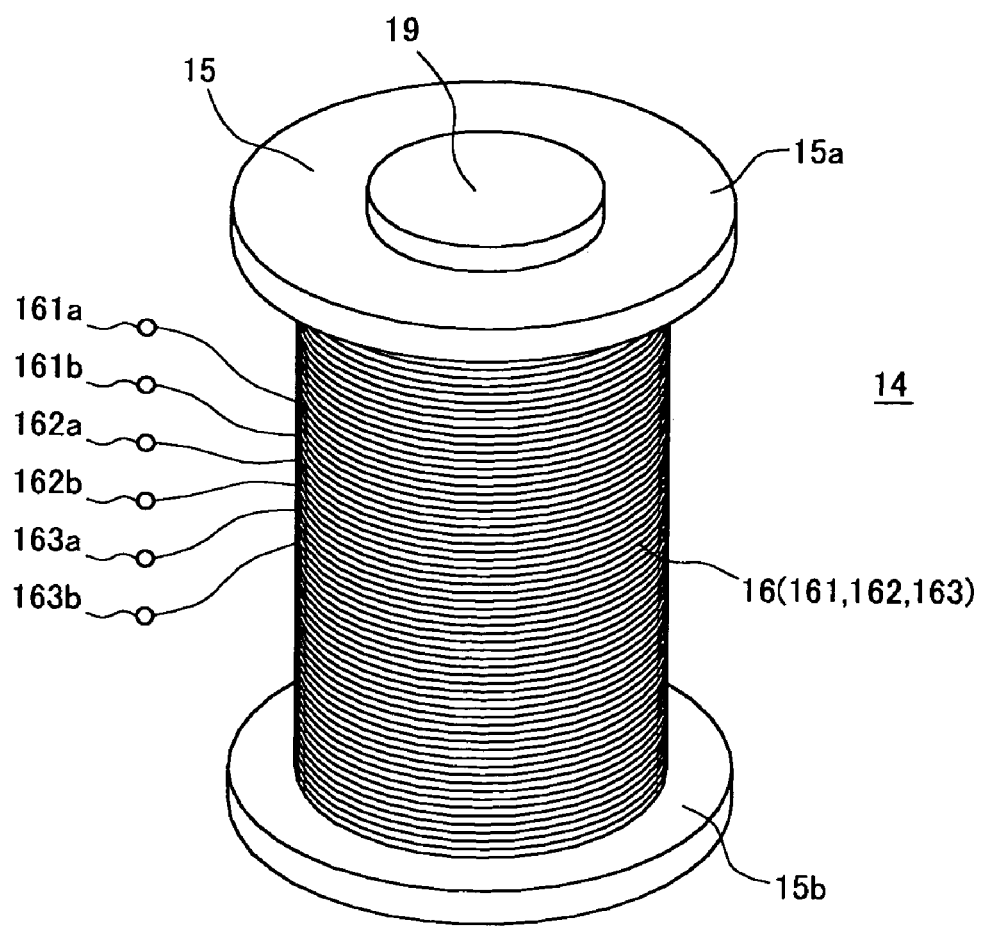

As shown in FIG. 9, the magnetic field generating coil unit 14 in this example comprises a coil bobbin (coil bobbin) 15 with flange portions 15a, 15b formed at its respective end portions of the hollow cylinder in the center line direction and a coil 16 wound around the coil bobbin 15. The coil bobbin 15 is made of a nonmagnetic material and includes a core 19 inserted into its hollow portion.

In this embodiment, the magnetic field generating coil unit 14 has three coils 161, 162, 163 wound abreast thereon as the coil 16 wound around one coil bobbin 15 in a triplex fashion in order to supply three frequency signals with three kinds of waveforms to the magnetic field generating apparatus, as will be described later on. Consequently, three pairs of coil terminals 161a and 161b, 162a and 162b and 163a and 163b are led out from one coil bobbin 15.

A plurality of magnetic field generating coil units 14 are disposed within the half-circumference covers 111 and 112 in such a manner that the direction of the magnetic flux may become perpendicular to the direction of running water in the pipe 30 when the frequency signal is supplied to the coils 161 to 163 to generate magnetic fields.

Figure 10:
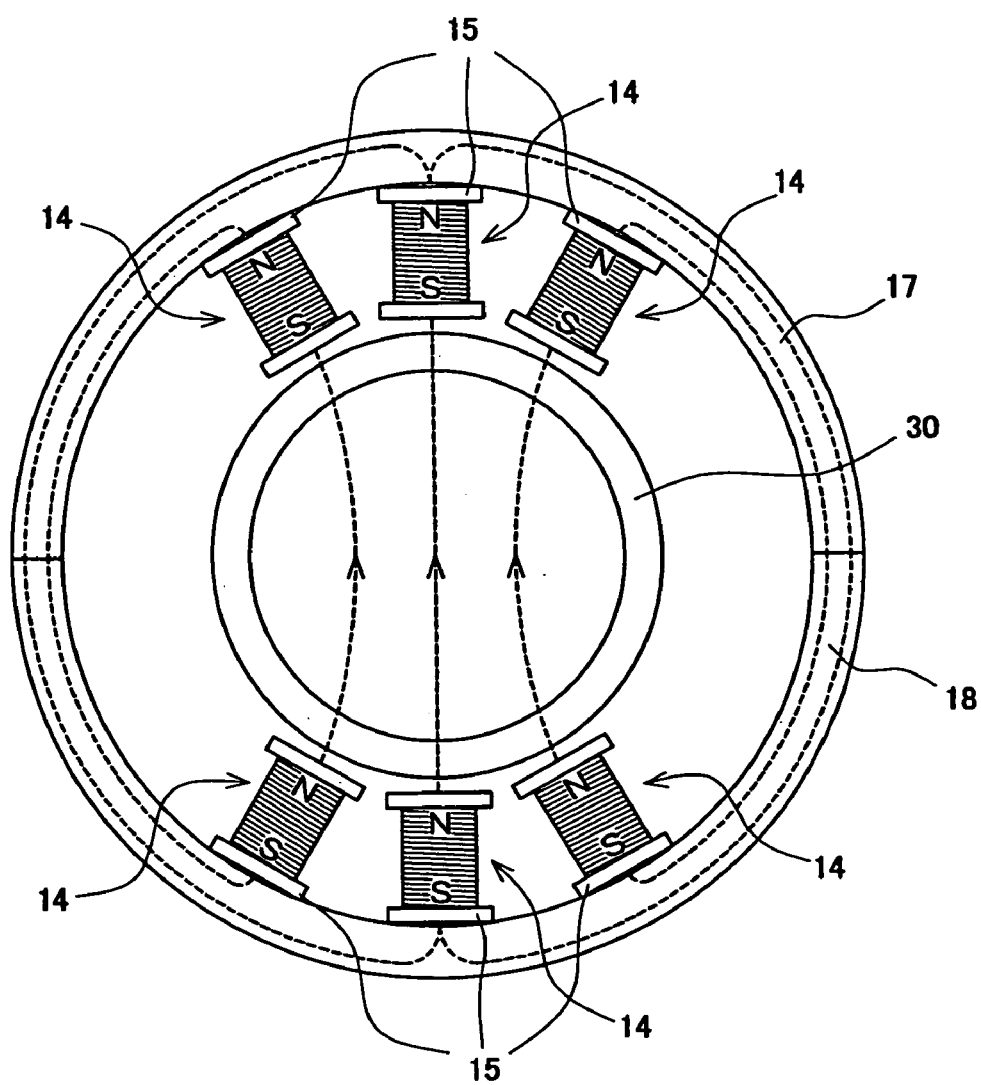

Specifically, a plurality of magnetic field generating coil units 14 are located within the half-circumference covers such that the center line direction of the coil bobbin 15 shown in FIG. 9 may become perpendicular to the circumference side surface of the pipe 30 as shown in FIG. 10 and that polarities of magnetic poles generated in the center line direction of the coil bobbin 15 when an electric current flows through the coil 16 may become opposite to each other in the magnetic field generating coil unit 14 disposed within the half-circumference cover 111 and the magnetic field generating coil unit 14 disposed within the half-circumference cover 112 as shown in FIG. 10.

In this case, as shown in FIGS. 8 and 10, the magnetic field generating coil unit 14 within the half-circumference cover 111 and the magnetic field generating coil unit 14 within the half-circumference cover 112 are provided at the positions in which they are opposing to each other across the pipe 30.

Further, as shown in FIGS. 8 and 10, in this example, half-ring-like magnetic yokes 17, 18 made of a magnetic material, e.g. a silicon steel plate are attached to the insides of the side circumference surfaces of the half-circumference covers 111 and 112 by fixing the magnetic yokes to the inner wall surfaces of the half-circumference covers 111, 112 with a suitable means such as adhesion or screws in order to prevent magnetic flux generated from the magnetic field generating coil units 14 from being leaked to the outside.

In the state in which the magnetic field generating apparatus 10 is attached to the pipe 30, the half-ring-like magnetic yokes 17, 18 within the half-circumference covers 111 and 112 are joined to form an annular magnetic yoke, and the whole of a plurality of magnetic field generating coil units 14 may be covered with this annular magnetic yoke. The magnetic field generating coil units 14 are fixed to the insides of the half-circumference covers 111, 112 by screws at the core portion, for example, through the magnetic yokes 17, 18.

Thus, when an electric current is supplied to the magnetic field generating coil units 14 to generate a magnetic field, as shown in FIG. 10, the magnetic flux passes only the inside of the pipe 30 and the insides of the magnetic yokes 17, 18 and thereby can be prevented from being leaked to the outside of the covers 111, 112. In that case, in the pipe 30, while the direction of running water becomes perpendicular to the sheet of drawing in FIG. 10, the direction of the magnetic flux becomes parallel to the sheet of drawing as shown by arrows and becomes perpendicular to the direction of running water.

As a result, since the angle $\theta$ between the direction of the magnetic flux in the aforementioned (equation 1) and the direction in which electric charges are moved by the running water is given as $\pi/2$, the Lorentz force F applied to moving electric charges is maximized, and hence it can be expected that descaling action will be effected efficiently. The direction of the magnetic flux and the direction of the running water need not become perpendicular to each other at high accuracy. So long as the two directions are crossing to each other, the angle $\theta$ does not become zero, and hence the Lorentz force can act on electrons effectively.

Figure 11:
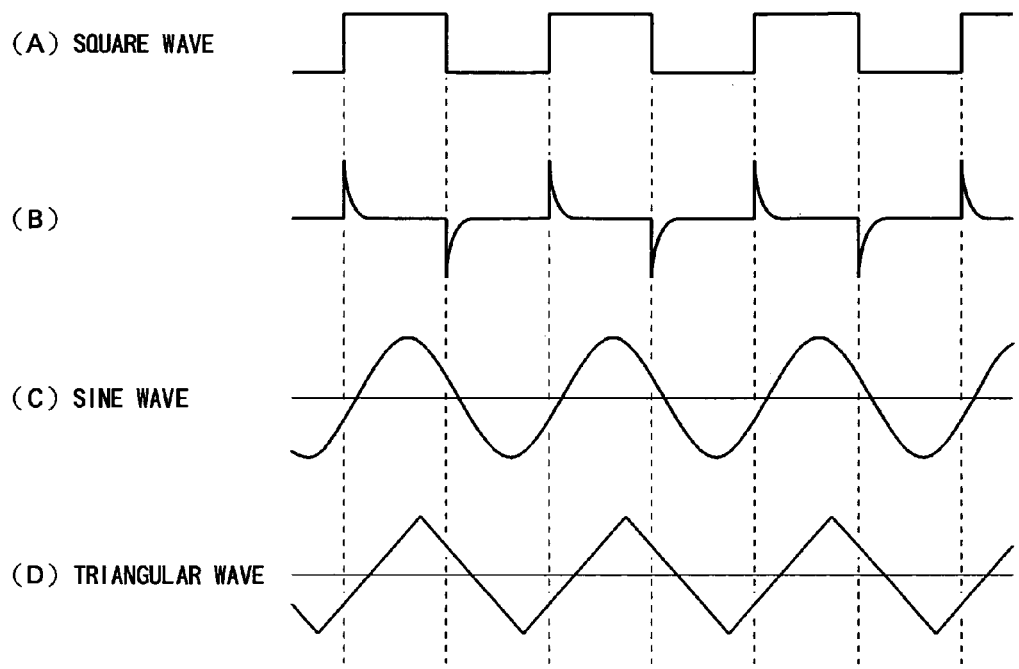
FIG. 11 is a diagram used to explain frequency signals supplied to the magnetic field generating apparatus for use with the descaling apparatus according to the embodiment of this invention.

This magnetic field generating apparatus 10 is not limited to the application to the descaling apparatus according to this embodiment and may be suitable for the application to the case in which magnetic fields are generated at a tube-like portion in the direction perpendicular or crossing the center line direction of the tube. [Arrangement of frequency signal generating apparatus 20] The frequency signal generating apparatus 20 according to this embodiment has an arrangement capable of generating four frequencies in a time-division manner in order to simultaneously remove different scales of up to four kinds in the example which will be described herein. In this embodiment, the frequency signal generating apparatus 20 may generate a square wave signal (see FIG. 11(A)), a sine wave signal (see FIG. 11(C)) and a triangular wave signal (see FIG. 11(D)) as signals supplied to the three coils 161, 162, 163 of the magnetic field generating coil unit 14.

When the square wave signal is supplied to the coil, a magnetic field becomes a pulse-like magnetic field which results from differentiating the square wave. This pulse-like magnetic field applies the Lorentz force to the electrons ionized in the water. It is considered that this pulse-like magnetic may strike the electrons. On the other hand, the sine wave signal may not strike the electrons but may act on the electrons as if they were to move heavy thing. Further, the triangular wave signal increases its energy and acts to move the electrons to the deep portion of the thickness direction of the scale.

In this case, the square wave signal, the sine wave signal and the triangular wave signal can become signals which are not synchronized with each other. When the frequencies of the square wave signal, the sine wave signal and the triangular wave signal are selected to be substantially equal to each other, it is recommended that the square wave signal and the triangular wave signal may be delayed in phase relative to the square wave signal. The frequencies of the sine wave signal and the triangular wave signal may be selected to be slightly lower than that of the square wave signal and then the sine wave signal and the triangular wave signal may be supplied to the coils. From a standpoint of a relationship between the sine wave signal and the triangular wave signal, both of them need not be selected to be the same in phase and frequency. For example, the phase of the triangular wave signal may be further delayed from that of the sine wave signal. Alternatively, the frequency of the triangular wave signal may be selected to be lower than that of the sine wave signal.

In this case, the frequency supplied to the square wave signal is a frequency that is set corresponding to the scale as mentioned before, and the phases and frequencies of the sine wave signal and the triangular wave signal are determined based upon this frequency signal.

The triangular wave signal becomes effective when the pipe 30 is large in diameter and the deposited scale is large in thickness. When the pipe 30 is small in diameter and the deposited scale is relatively thin, the square wave signal and the sine wave signal may be supplied to the coil unit 14 and the triangular wave signal need not be supplied to the coil unit with the Lorentz force acting on the electrons effectively. In that case, the coil unit 14 may include a duplex-winding coil. Fundamentally, it is possible to remove scale by supplying only the square wave signal to the coil. In that case, the coil unit 14 may include a single-winding coil.

Figure 12:
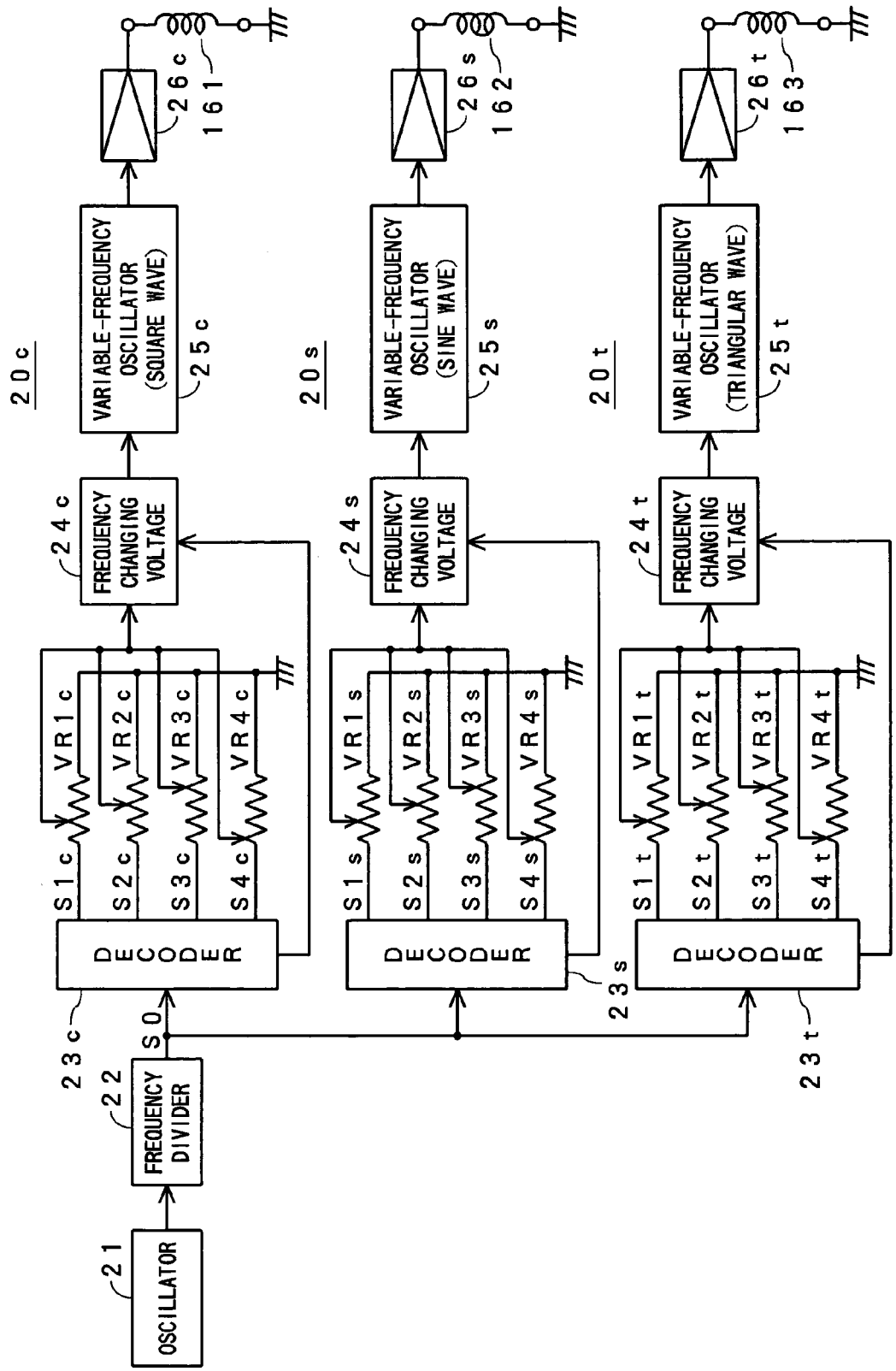
FIG. 12 is a block diagram used to explain a frequency signal generating apparatus of the descaling apparatus according to the embodiment of the present invention.

FIG. 12 is a block diagram of the frequency signal generating apparatus 20 according to this embodiment. As illustrated, the frequency signal generating apparatus 20 includes a square wave signal generating unit 20c, a sine wave signal generating unit 20s and a triangular wave signal generating unit 20t. These three signal generating units 20c, 20s, 20t include voltage-controlled type variable-frequency oscillators 25c, 25s, 25t which are able to generate their own wave signals, respectively.

Figure 13:
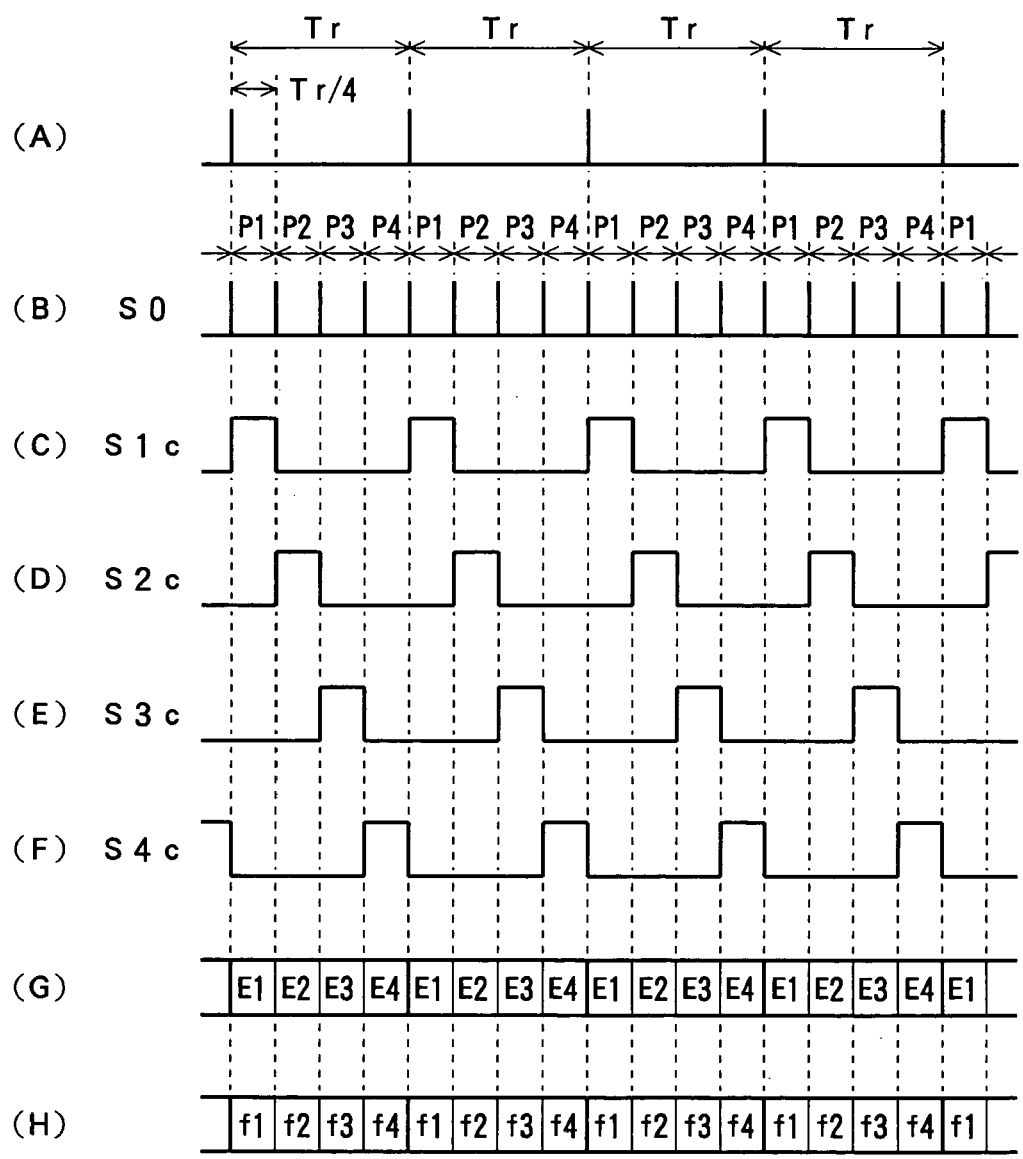

In each of these three signal generating units 20c, 20s, 20t, as shown in FIG. 13(A), the interval of a time-division repetitive period Tr is divided to provide four time-division unit intervals P1, P2, P3, P4 on the assumption that the time interval of the divided-by-four interval Tr/4 is used as the time-division unit interval.

When different voltages are respectively supplied to the variable-frequency oscillators 25c, 25s, 25t at every time-division unit time intervals P1, P2, P3, P4, the variable-frequency oscillators 25c, 25s, 25t can generate signals having four kinds of frequencies at maximum in a time-division manner.

In this example, the duration of the time-division repetitive cycle Tr is selected to be 4 seconds, for example, and accordingly, the duration of the time-division unit interval is set to 1 second.

An oscillator 21 is an oscillator that generates a reference clock of time-division timing. A reference clock signal from this oscillator 21 is supplied to a frequency divider 22. This frequency divider 22 generates a time-division timing signal S0 (see FIG. 13(B)) whose one period is selected to be the unit interval of Tr/4. The thus generated time-division timing signal S0 is supplied to decoders 23c, 23s and 23t of the square wave signal generating unit 20c, the sine wave signal generating unit 20s and the triangular wave signal generating unit 20t.

Arrangements and operations of the three signal generating units 20c, 20s and 20t following the decoders 23c, 23s and 23s to generate the signals with frequencies of up to four kinds in a time-division manner are similar in those three signal generating units 20c, 20s, 20t, and hence the case of the square wave signal generating unit 20c will be described below.

In the sine wave signal generating unit 20s and the triangular wave signal generating unit 20t, respective circuit blocks corresponding to the respective arrangement blocks in the square wave signal generating unit 20c are denoted by identical reference numerals with suffixes "s" and "t" in FIG. 12.

The decoder 23c is composed of a counter for counting the time-division timing signal S0 from the frequency divider 22 and a circuit portion for identifying its count value to generate sequentially a time-division interval signal S1c (see FIG. 13(C)), a time-division interval signal S2c (see FIG. 13(D)), a time-division interval signal S3c (see FIG. 13(E)), a time-division interval signal S4c (see FIG. 13(F)) indicative of first, second, third and fourth Tr/4 time-division unit intervals P1, P2, P3, P4 within the interval of the repetitive period Tr. In this example, the time-division interval signals S1c, S2c, S3c, S4c are signals which go to high level only during the first, second, third and fourth Tr/4 time-division unit intervals P1, P2, P3, P4 within the interval of the repetitive period Tr.

The decoder 23c includes four output terminals in order to independently output these four time-division interval signals S1c, S2c, S3c, S4c. The four output terminals of the decoder 23c are connected with variable resistors VR1c, VR2c, VR3c, VR4c for use in setting voltages.

Therefore, as shown in FIG. 13(G), in the time-division unit interval P1 during which the time-division interval signal S1c from the decoder 23c goes to high level, a voltage E1 corresponding to the resistance value of the variable resistor VR1c is supplied through a frequency change voltage adding circuit 24c to a variable-frequency oscillator 25c.

Similarly, as shown in FIG. 13(G), in the time-division unit interval P2 during which the time-division interval signal S2c from the decoder 23c goes to high level, a voltage E2 corresponding to the resistance value of the variable resistor VR2c is supplied through the frequency change voltage adding circuit 24c to the variable-frequency oscillator 25c. In the time-division unit interval P3 during which the time-division interval signal S3C from the decoder 23C goes to high level, a voltage E3 corresponding to the resistance value of the variable resistor VR3c is supplied through the frequency change voltage adding circuit 24C to the variable-frequency oscillator 25c. Further, in the time-division unit interval P4 during which the time-division interval signal S4c from the decoder 23c goes to high level, the voltage E4 corresponding to the resistance value of the variable resistor VR4c is supplied through the frequency change voltage adding circuit 24c to the variable-frequency oscillator 25c.

Specifically, the voltages E1, E2, E3, E4 corresponding to the resistance values of the variable resistors VR1c, VR2c, VR3c, VR4c are sequentially supplied through the frequency change voltage adding circuit 24c to the variable-frequency oscillator 25c during the respective time-division unit intervals P1, P2, P3, P4.

The respective resistance values of the variable resistors VR1c, VR2c, VR3c, VR4c are adjusted in advance and set in response to the type of scale to be removed and the number of scales to be removed, as will be described later on.

Having disregarded the existence of the frequency change voltage adding circuit 24c for simplicity of description, it is to be noted that the variable-frequency oscillator 25c receives the voltages E1, E2, E3, E4 supplied at the time-division timings as described above to generate square wave signals with frequencies f1, f2, f3, f4 corresponding to the applied voltages of their intervals during the respective time-division unit intervals P1, P2, P3, P4 (see FIG. 13(H)).

Next, the frequency change voltage adding circuit 24c will be described. The resistance values of the variable resistors VR1c, VR2c, VR3c, VR4c are set as mentioned hereinbefore, whereby the square wave signals with frequencies corresponding to scales to be removed are generated from the variable-frequency oscillator 25c.

However, it is assumed that the signals with the desired frequencies cannot always be obtained due to conditions of circumstances such as temperature in the place where the descaling apparatus is in use. Moreover, it is generally difficult to adjust the resistance values of the variable resistors VR1c, VR2c, VR3c, VR4c such that the frequency signals exactly matched with the desired frequencies may be obtained from the variable-frequency oscillator 25c. The frequency change voltage adding circuit 24c is provided in order to solve this problem.

Specifically, the frequency change voltage adding circuit 24c can solve this problem by changing the frequencies of the respective time-division unit intervals P1, P2, P3, P4 around the set frequency within a predetermined frequency range. In other words, even when the set frequency is slightly displaced from the desired frequency, by changing the frequency within the frequency range around the set frequency, the frequency signal generated from the variable-frequency oscillator 25c can always contain a desired frequency, and hence the above-described problem can be solved.

Therefore, in this example, the signal with the time-division period Tr from the decoder 23c is supplied to the frequency change voltage adding circuit 24c, and the frequency change voltage adding circuit 24c adds a frequency change additional voltage to the inputted voltage during the time-division period Tr.

FIG. 14 is a diagram used to explain operations of this frequency change voltage adding circuit 24c. FIG. 14 shows the case in which the output frequency f1 of the variable-frequency oscillator 25c and which corresponds to the voltage E1 in the time-division unit interval P1 is changed in a range of ±Δf.

Specifically, with respect to the voltage E1 supplied to the variable-frequency oscillator 25c, the output frequency of the variable-frequency oscillator 25c is changed by adding an additional voltage (this additional voltage may not always be limited to a positive voltage but may be a negative voltage) to the voltage E1 at every time-division repetitive period Tr within the voltage range ±ΔE corresponding to the above-described frequency range ±Δf.

In the example of FIG. 14, the additional voltage is sequentially added to the voltage E1 by ΔE/2 each. When an added amount to the voltage E1 reaches ΔE, the added amount is subtracted by ΔE/2 each. When the subtracted amount from the voltage E1 reaches −ΔE, the additional voltage is again added sequentially to the above voltage again by ΔE/2 each. This processing has been described so far by way of example, and it is needless to say that the additional voltage step width is not limited to ΔE/2 and may be set arbitrarily. Moreover, the value of ΔE corresponding to the frequency change range can be set arbitrarily.

Further, the additional voltage may not always be sequentially added to and subtracted from the voltage as in the example of FIG. 14 but the added or subtracted additional voltage may be randomly supplied to the voltage E1 within the voltage range of ±ΔE.

While the frequency change voltage is added to the voltage at every period of the time-division repetitive period Tr of each time-division unit interval as described above, the present invention is not limited thereto and the frequency change voltage may be added to the voltage at every plurality of periods of the time-division repetitive period Tr. Moreover, when the time-division unit interval is selected to be a relatively long time period, each time-division unit interval is further divided into short time-division unit intervals and the frequency change voltage may be added to the voltage at every divided interval, whereby the frequency can be changed within each time-division unit interval.

As described above, according to this embodiment, the variable-frequency oscillator 25c can generate the square wave signals with the frequencies corresponding to the set resistance values of the variable resistors VR1c, VR2c, VR3c, VR4c during the respective time-division unit intervals P1, P2, P3, P4.

Similarly, the variable-frequency oscillators 25s and 25t of the square wave signal generating unit 20s and the triangular wave signal generating unit 20t can generate the sine wave signals and the triangular wave signals in which the frequencies are changed in response to the voltages added by the frequency change voltage adding circuits 24s and 24t around the center frequencies of the frequencies corresponding to the set resistance values of the variable resistors VR1s, VR2s, VR3s, VR4s and VR1t, VR2t, VR3t, VR4t during the time-division unit intervals P1, P2, P3, P4.

The signals generated from the variable-frequency oscillators 25c, 25s, 25t as described above are supplied through respective amplifiers 26c, 26s, 26t to the respective coils 161, 162, 163 of the respective magnetic field generating coil units. As a result, an alternating magnetic field that alternates at the supplied frequency is generated, and hence scale can be removed as mentioned before.

[Number of Scales to be Removed and Example of How to Set Frequencies]

Next, the manner of adjusting resistance values of variable resistors in respective cases wherein the number of scales to be removed falls within a range of from 1 to 4 when the scale is removed by the frequency signal generating apparatus 20 having the above-mentioned arrangement will be described. When the scale adhered on the inner wall surface of the pipe 30 is to be removed, it is customary to examine components contained in the water running through the pipe 30. The reason for this is that scales adhered on the inner wall surface of the pipe 30 may be considered as deposits of components contained in the water. In this example, since the number of scales to be removed and scale component ratios of respective scales can be detected based upon the result of analyzing the components in the water, one scale or a plurality of scales can efficiently be removed based upon the detected number of scales and the detected scale component ratios.

(1) In the Case Wherein One Kind of Scale Should Be Removed.

The case in which one kind of scale A should be removed and in which a frequency required when an electric current is flowing through the water covering the scale A as a solvent within a magnetic field is a frequency fa will be described. In this case, since the frequency that is to be set as the frequency that should be generated from the frequency signal generating unit 20 is the frequency fa, in this example, the operator sets the respective resistance values of the variable resistors VR1c, VR2c, VR3c, VR4c such that the square wave signal generating unit 20c, for example, generates a voltage Ea so that the variable-frequency oscillator 25c may generate the square wave signal using the frequency fa as a center frequency thereof.

Since the respective resistance values are set as described above, in the case of this example, in the square wave signal generating unit 20c, as shown in FIG. 15(A), during all of the time-division unit intervals P1, P2, P2, P4, the same voltage Ea is supplied through the frequency change voltage adding circuit 24c to the variable-frequency oscillator 25c, and the variable-frequency oscillator 25c generates a square wave signal corresponding to the voltage Ea and whose frequency is changed around the center frequency of the single frequency fa as shown in FIG. 15(B).

Similarly, the operator sets the resistance values of the variable resistors VR1s, VR2s, VR3s, VR4s and VR1t, VR2t, VR3t, VR4t such that the sine wave signal generating unit 20s and the triangular wave signal generating unit 20t generate voltages so that the variable-frequency oscillators 25s and 25t generate frequency signals having the frequency fa or frequencies lower than the frequency fa.

Then, in the sine wave signal generating unit 20s and the triangular wave signal generating unit 20t, during all of the time-division unit intervals P1, P2, P3, P4, the same voltage is supplied through the frequency change voltage adding circuit 24 to the variable-frequency oscillators 25s and 25t so that the variable-frequency oscillators 25s and 25t generate a sine wave signal and a triangular wave signal with frequencies which shift at the center frequency of the single frequency fa corresponding to the supplied voltage or the frequency lower than the frequency fa.

Therefore, in the case of the above-mentioned example, the respective waveform signals having the center frequencies of the single frequency are constantly supplied to the coils 161, 162, 163, and hence one kind of scale to be removed can be removed efficiently.

The present invention is not limited to the above-mentioned example in which the single frequency signal is supplied to the coils during all of the time-division unit intervals P1, P2, P3, P4, and the present invention can be modified such that the above-described single frequency signal may be supplied to the coils during only the time-division unit interval P1, or during only the time-division unit intervals P1 and P2 or during only the time-division unit intervals P1 to P3.

However, as described in the above-mentioned example, all of the time-division unit intervals P1, P2, P3, P4 are used to remove one kind of scale, whereby a desired scale can be removed efficiently and effectively.

(2) In the Case Wherein Two Kinds of Scales are to Be Removed and the Scale Component Ratio is 1:1.

For example, the case in which scales to be removed are two kinds of scale A and scale B, the removing ratio being 1:1 will be described. Herein, fa assumes a frequency required when an electric current flows through water serving as a solvent covering the scale A within a magnetic field, and fb assumes a frequency required when an electric current flows through water serving as a solvent covering the scale B within a magnetic field.

In this case, while the set frequencies that should be generated from the frequency signal generating apparatus 20 become the frequencies fa and fb, according to this example, the frequency fa may be set as the center frequency during the time-division unit intervals P1 and P2 and the frequency fb may be set as the center frequency during the time-division unit intervals P3 and P4.

Specifically, the operator may set the resistance values of the variable resistors VR1c and VR2c equal to each other so that the square wave signal generating unit 20c may generate a voltage Ea so that the variable-frequency generator 25c generates a square wave signal using the frequency fa as a center frequency. Also, the operator may set the respective resistance values of the variable resistors VR3c, VR4c equal to each other so that the square wave signal generating unit 20c may generate a voltage Eb so that the variable-frequency oscillator 25c generates a square wave signal using the frequency fb as the center frequency.

Since the resistance values of the variable resistors are set to the above-mentioned values as described above, as shown in FIG. 15 (C), the voltage Ea is supplied to the variable-frequency oscillator 25c during the time-division unit intervals P1 and P2 and the voltage Eb is supplied to the variable-frequency oscillator 25c during the time-division unit intervals P3 and P4 so that the variable-frequency oscillator 25c generates a square wave signal whose frequency is changed at the center frequency of the frequency fa during the time-division unit intervals P1 and P2 and the square wave signal whose frequency is changed at the center frequency of the frequency fb during the time-division unit intervals P3 and P4 as shown in FIG. 15 (D).

Also in the sine wave signal generating unit 20s and the triangular wave signal generating unit 20t, the resistance values of the variable resistors VR1s, VR2s, VR3s, VR4s and VR1t, VR2t, VR3t, VR4t are set in a similar manner so that there are generated the sine wave signal and the triangular wave signal whose frequencies are changed at the center frequency of the frequency fa or the center frequency of the lower frequency during the time-division unit intervals P1 and P2 and whose frequencies are changed at the center frequency of the frequency fb or the center frequency of the lower frequency during the time-division unit intervals P3 and P4.

Accordingly, the signals that are changed at predetermined frequency ranges at the two frequencies fa, fb or the nearby frequencies are substantially simultaneously supplied to the respective coils 161, 162, 163 of the magnetic field generating coil unit 14 in a time-division manner, whereby the two kinds of scales A and B are removed at the same time.

(3) In the Case Wherein Two Kinds of Scales are to be Removed and a Scale Component Ratio is 3:1.

For example, the case in which scales to be removed are two kinds of scales A and B and the removing ratio is 3:1 will be described. Herein, fa assumes a frequency required when an electric current flows through water serving as a solvent covering the scale A within a magnetic field, and fb assumes a frequency required when an electric current flows through water serving as a solvent covering the scale B within a magnetic field.

In this case, although the set frequencies that should be generated from the frequency signal generating unit 20 become the frequencies fa and fb, their scale component ratios are different from each other so that, according to this example, the frequency fa is set to the center frequency during the time-division unit intervals P1, P2 and P3 and the frequency fb is set to the center frequency during the time-division interval P4 in response to the scale component ratios.

Specifically, the operator sets the resistance values of the variable resistors VR1c and VR2c and VR3c may become equal to each other so that the square wave signal generating unit 20c may generate a voltage Ea so that the variable-frequency oscillator 25c may generate a square wave signal using the frequency fa as the center frequency. Also, the operator sets the resistance value of the variable resistor VR4c so that the square wave signal generating unit may generate a voltage Eb so that the variable-frequency oscillator 25c may generate a square wave signal using the frequency fb as the center frequency.

Since the respective resistance values are set as described above, as shown in FIG. 15(E), the voltage Ea is supplied to the variable-frequency oscillator 25c during the time-division unit intervals P1, P2 and P3 and the voltage Eb is supplied to the variable-frequency oscillator 25c during the time-division unit interval P4 so that, as shown in FIG. 15(F), the variable-frequency oscillator 25c generates the square wave signal whose frequency is changed at the center frequency of the frequency fa during the time-division unit intervals P1, P2 and P3 and the square wave signal whose frequency is changed at the center frequency of the frequency fb during the time-division unit interval P4.

Also in the sine wave signal generating unit 20s and the triangular wave signal generating unit 20t, the resistance values of the variable resistors VR1s, VR2s, VR3s, VR4s and VR1t, VR2t, VR3t, VR4t are set in a similar manner so that the sine wave signal generating circuit and the triangular wave signal generating circuit generate a sine wave signal and a triangular wave signal whose frequencies are changed at the center frequency of the frequency fa or at the center frequency of the lower frequency during the time-division unit intervals P1, P2 and P3 and a sine wave signal and a triangular wave signal whose frequencies are changed at the center frequency of the frequency fb or at the center frequency of the lower frequency during the time-division unit interval P4.

Accordingly, the signals whose frequencies change within the predetermined frequency range at the center frequencies of the two frequencies fa, fb or the nearby frequencies are substantially simultaneously supplied to the respective coils 161, 162, 163 of the magnetic field generating coil unit 14 at a time ratio corresponding to the scale component ratio, whereby the two kinds of the scales A and B can be removed efficiently at the same time.

(4) In the Case Wherein Three Kinds of Scales are to be Removed and a Scale Component Ratio is 1:1:1.

For example, the case in which the scales to be removed are three kinds of a scale A, a scale B and a scale C and a removing ratio is 1:1:1 will be described. Herein, fa assumes a frequency required when an electric current flows through water serving as a solvent covering the scale A within a magnetic field and fb assume a frequency required when an electric current flows through water serving as a solvent covering the scale B within a magnetic field. Further, fc assumes a frequency required when an electric current flows through water serving as a solvent covering the scale C within a magnetic field.

In this case, although the set frequencies that should be generated from the frequency signal generating unit 20 become the frequencies fa, fb and fc, since the scale component ratios are equal to each other, in this example, the frequency fa is set to the center frequency during the time-division unit interval P1, the frequency fb is set to the center frequency during the time-division unit interval P2 and the frequency fc is set to the center frequency during the time-division unit interval P3 in response to the scale component ratios. The time-division unit interval P4 may be set to a pause interval or the frequency may be set to a free oscillation frequency of a variable-frequency oscillator.

At that time, the operator sets the resistance value of the variable resistor VR1c so that the square wave signal generating unit 20c may generate a voltage Ea so that the variable-frequency oscillator 25c may generate a square wave signal using the frequency fa as the center frequency. The operator sets the resistance value of the variable resistor Vr2c so that the square wave signal generating unit may generate a voltage Eb so that the variable-frequency oscillator 25c may generate a square wave signal using the frequency fb as the center frequency. Further, the operator sets the resistance value of the variable resistor Vr3c so that the square wave signal generating unit may generate a voltage Ec so that the variable-frequency oscillator 25c may generate the square wave signal using the frequency fc as the center frequency.

Since the resistance values of the variable resistors are set as described above, as shown in FIG. 15(G), the voltage Ea is supplied to the variable-frequency oscillator 25c during the time-division unit interval P1, the voltage Eb is supplied to the variable-frequency oscillator 25c during the time-division unit interval P2, and the voltage Ec is supplied to the variable-frequency oscillator 25c during the time-division unit interval P3. Accordingly, as shown in FIG. 15(H), the variable-frequency oscillator 25c generates the square wave signal whose frequency is changed at the center frequency of the frequency fa during the time-division unit interval P1, the variable-frequency oscillator generates the square wave signal whose frequency is changed at the center frequency of the frequency fb during the time-division unit interval P2 and the variable-frequency oscillator generates the square wave signal whose frequency is changed at the center frequency of the frequency fc during the time-division unit interval P3.

Also in the sine wave signal generating unit 20s and the triangular wave signal generating unit 20t, the resistance values of the variable resistors VR1s, VR2s, VR3s, VR4s and VR1t, VR2t, VR3t, VR4t are set similarly so that there are generated the sine wave signal and the triangular wave signal whose frequencies are changed at the center frequency of the frequency fa or the lower frequency during the time-division unit interval P1, the sine wave signal and the triangular wave signal whose frequencies are changed at the center frequency of the frequency fb or the lower frequency during the time-division unit interval P2 and the sine wave signal and the triangular wave signal whose frequencies are changed at the center frequency of the frequency fc or the lower frequency during the time-division unit interval P3.

Accordingly, the signals whose frequencies are changed around the three frequencies fa, fb, fc or nearby frequencies within the predetermined frequency ranges are substantially simultaneously supplied to the respective coils 161, 162, 163 of the magnetic field generating coil unit 14 at a time ratio corresponding to the scale component ratio, whereby the three kinds of the scales A, B and C can be removed efficiently and simultaneously.

(5) In the Case in Which Three Kinds of Scales are to be Removed and a Scale Component Ratio is 1:1:2.

The case in which scales to be removed are three kinds of scale A, scale B and scale C and a removing ratio is 1:1:2 will be described. This example is equal to the case in which the scale component ratio of the scale C increases twice in the aforementioned case (4).

Accordingly, in that case, in the case of the aforementioned case (4), the time-division unit interval P4 which is not yet used is assigned to the frequency fc for use in removing the scale C. Specifically, the reason for this will be described with reference to the square wave signal generating unit 20c, for example. The resistance values of the variable resistors VR1c, VR2c, VR3c are set similarly to the aforementioned case (4) and the resistance value of the variable resistor VR4c is set to a value so that the square wave signal generating unit may generate the voltage Ec so that the variable-frequency oscillator 25c may generate the square wave signal with the center frequency of the frequency fc.

Since the resistance values of the variable resistors were set in that manner, as shown in FIG. 15(I), during the time-division unit interval P1, the voltage Ea is supplied to the variable-frequency oscillator 25c, during the time-division unit interval P2, the voltage Eb is supplied to the variable-frequency oscillator 25c, and during the time-division unit intervals P3 and P4, the voltage Ec is supplied to the variable-frequency oscillator 25c. Thus, as shown in FIG. 15(J), the variable-frequency oscillator 25c generates the square wave signal of which the frequency is changed at the center frequency of the frequency fa during the time-division unit interval P1, the variable-frequency oscillator generates the square wave signal of which the frequency is changed at the center frequency of the frequency fb during the time-division unit interval P2, and the variable-frequency oscillator generates the square wave signal of which the frequency is changed at the center frequency of the frequency fc during the time-division unit intervals P3 and P4.

Also in the sine wave signal generating unit 20s and the triangular wave signal generating unit 20t, the resistance values of the variable resistors VR1s, VR2s, VR3s, VR4s and VR1t, VR2t, VR3t, VR4t are set in a similar manner so that the sine wave signal generating unit and the triangular wave signal generating unit may generate a sine wave signal and a triangular wave signal of which the frequencies are changed at the center frequency of the frequency fa or the lower frequency during the time-division unit interval P1, the sine wave signal generating unit and the triangular wave signal generating unit may generate a sine wave signal and a triangular wave signal of which the frequencies are changed at the center frequency of the frequency fb or the lower frequency during the time-division unit interval P2 and that the sine wave signal generating unit and the triangular wave signal generating unit may generate a sine wave signal and a triangular wave signal of which the frequencies are changed at the center frequency of the frequency fc or the lower frequency during the time-division unit intervals P3 and P4.

Therefore, the signals which are changed at the center frequencies of the three frequencies fa, fb, fc of the nearby frequencies within the predetermined frequency ranges are supplied substantially simultaneously to the respective coils 161, 162, 163 of the magnetic field generating coil unit 14 in a time-division manner at a time ratio corresponding to their scale component ratio and thereby the three kinds of scales A, B and C can efficiently be removed at the same time.

(6) The Case in Which There are Four Kinds of Scales to be Removed:

In the case of this example, since the time-division unit intervals are four intervals P1 to P4, when four kinds of scales are to be removed, the time-division unit intervals P1 to P4 are assigned to four scales correspondingly.

For example fa assumes a frequency at which an electric current flows through water serving as a solvent covering the scale A within a magnetic field when there are four kinds of scale A, scale B, scale C and scale D to be removed, fb assumes a frequency at which an electric current flows through water serving as a solvent covering the scale B within a magnetic field, fc assumes a frequency at which an electric current flows through water serving as a solvent covering the scale C within a magnetic field and fd assumes a frequency at which an electric current flows through water serving as a solvent covering the scale D within a magnetic field.

In this case, the square wave signal generating unit 20c, for example, will be described. The operator sets the resistance values of the variable resistors VR1c, VR2c, VR3c, VR4c such that this square wave signal generating unit may generate voltages Ea, Eb, Ec, Ed so that the variable-frequency oscillator 25c may generate square wave signals with center frequencies of the frequencies fa, fb, fc, fd, respectively.

As a result, as shown in FIG. 15(K), during the time-division unit intervals P1, P2, P3, P4, the voltages Ea, Eb, Ec, Ed which are different from each other are supplied to the variable-frequency oscillator 25c so that the variable-frequency oscillator 25c may generate square wave signals of which frequencies are changed at the center frequencies of the different frequencies fa, fb, fc, fd during the time-division unit intervals P1, P2, P3, P4 as shown in FIG. 15(L).

In a similar manner, the sine wave signal generating unit 20s and the triangular wave signal generating unit 20t generate sine wave signals and triangular wave signals of which frequencies are changed at the center frequencies of the different frequencies fa, fb, fc, fd or the lower frequencies during the time-division unit intervals P1, P2, P3, P4.

Therefore, the signals which are changed at the center frequencies of the four frequencies fa, fb, fc, fd or the nearby frequencies within the predetermined frequency ranges are supplied substantially simultaneously to the respective coils 161, 162, 163 of the magnetic field generating coil unit 14 in a time-division manner at a time ratio corresponding to their scale component ratio and thereby four kinds of scales A, B, C and D can be removed efficiently and simultaneously.

Since the above-described case has the four time-division unit intervals, when more than four kinds of scales are to be removed, time intervals corresponding to the scale component ratio of the respective scales cannot be assigned. However, if more than four time-division unit intervals are assigned to scales, then it becomes possible to efficiently remove four kinds of scales or more in response to the scale component ratio. For example, if it is intended to remove more than 30 kinds of scales, then more than 30 time-division unit intervals may be assigned to scales.

If more than four time-division unit intervals are assigned to scales, then when less than four kinds of scales are to be removed, it becomes possible to assign time-division unit intervals that closely corresponds to the scale component ratio.

[Explanation on Example of Descaling Process]

Next, a descaling process will be described below with reference to the case wherein a scale is iron oxide (in the case of $Fe_2O_3$).

When being touched with water, iron is changed to divalent iron ions ($Fe^{2+}$) and dissolved into water. Specifically,

$$Fe \rightarrow Fe^{2+} + 2e^- \qquad \text{(chemical formula 1)}$$

Divalent iron ions are bonded to hydroxylation ions ($OH^-$) and thereby changed to iron (I) hydroxide ($Fe(OH)_2$). Specifically,

$$Fe^{2+} + 2H_2O \rightarrow Fe(OH)_2 + 2H^+ \qquad \text{(chemical formula 2)}$$

The iron (I) hydroxide ($Fe(OH)_2$) is immediately oxidized by oxygen in the water and thereby changed to iron (II) hydroxide ($Fe(OH)_3$). Specifically,

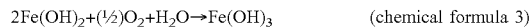

$$2Fe(OH)_2 + (½)O_2 + H_2O \rightarrow Fe(OH)_3 \qquad \text{(chemical formula 3)}$$

Further, this iron (II) hydroxide ($Fe(OH)_3$) is hydrolyzed and thereby changed to red rust ($Fe_2O_3$).

A mechanism for generating red rust has been described so far. When the descaling apparatus according to the above-mentioned embodiment supplies the square wave signal and the sine wave signal, and furthermore the triangular wave signal, if necessary, set and obtained as mentioned above based upon the frequencies at which an electric current flows through the water serving as the solvent covering the red rust to the coils, at the same time the occurrence of red rust can be suppressed by efficiently-ionized electro-magnetized water as follows, the thus generated red rusts are removed from the pipe.

Specifically, although iron ions ionized from the red rust formed as the scale and iron ions inherently contained in the water that is wastewater as mentioned before are changed into ion (I) hydroxide (Fe (OH)$_2$) as shown by the above-mentioned (chemical formula 2) and also changed to reddish brown sludge-lie ion (II) hydroxide (Fe(OH)$_3$) as shown by the aforementioned (chemical formula 3), they are made difficult to change to ion (II) hydroxide (Fe(OH)$_3$) by reduction of ionized electro-magnetized water.

Then, the generated iron (I) hydroxide (Fe(OH)$_2$) is not changed into red rusts but black rust in which divalent iron ions and trivalent iron ions are combined is generated as follows.

That is, $$3Fe(OH)_2 \rightarrow Fe_3O_4 + 2H_2O + H_2 \quad \text{(chemical formula 4)}$$

$$2H + 2e^- \rightarrow H_2 \quad \text{(chemical formula 5)}$$

Alternatively, $$Fe^{2+} + Fe_2O_3 + H_2O \rightarrow FeO.Fe_2O_3 + H_2 \quad \text{(chemical formula 6)}$$

$$3Fe^{2+} + 2O_2 \rightarrow FeO.Fe_2O_3 \quad \text{(chemical formula 7)}$$

Specifically, in the case of this embodiment, the state expressed by the (chemical formula 2) directly proceeds to the state expressed by the (chemical formula 4) or the state expressed by the (chemical formula 6) so that, while red rusts are being prevented from being generated, scales are removed and thereby black rust coating that may not corrode the pipe is produced.

Then, iron ions in the water are changed to hydration ions and hydration ions are washed away by running water into the lower part where no magnetic field is formed by the coils. Then, in the lower part, iron ions absorb electrons from the scale, whereby iron ions are discharged from the scale and dissolved into the water. Thereafter, the above-mentioned similar action occurs.

The above-mentioned action occurs in the lower part of the running water and continues until a period in which the effect of iron ions lapses (this period is considered to be equivalent to a half-value period).

[Major Elements of Scales that can be Removed]

The inventors of the present application have already specified frequencies of frequency signals required when an electric current flows through the solvent with respect to metal elements on the periodic table, such as Li, Be, Na, Mg, Al, K, Ca, Se, Ti, V, Cr, Mn, Fe, Co, Ni, Cu, Zn, Ga, Ge, Rb, Sr, Y, Zr, Nb, Mo, Tc, Ru, Rh, Pd, Ag, Cd, In, Sn, Cs, Ba, Hf, Ta, W, Re, Os, Ir, Pt, Au, Hg, Tl, Pb, Fr, Ra, Ac, Th, Pa, U, Np, Pu, Am, Cm, Bk, Cf, Es, Fm and 72 kinds of materials such as semiconductor Si. Therefore, by using the above-mentioned descaling method according to the embodiment of this invention, it is possible to remove scales composed of these elements.

OTHER MODIFIED EXAMPLE

As mentioned before, element ions ionized by electrons applied with Lorentz force from the magnetic field do not disappear in a moment but they can exist due to hydration produced by water component during a predetermined time period. Accordingly, the magnetic fields generated when the frequency signal of every scale is supplied to the coils need not exist continuously. Therefore, the frequency signal need not be supplied to the coils constantly but the frequency signal may intermittently be supplied to the coils such as when the frequency signal is supplied to the coils for 10 minutes in a time-division manner as described above after the supply of the frequency signal was paused for 10 minutes since the frequency signal has been supplied to the coil for 10 minutes in a time-division manner with the above-mentioned similar descaling effects being achieved.

While the solvent is water in the above explanation, the solvent is not limited to water and may be liquid other than water. Moreover, the solvent is not limited to liquid and may be gas such as steam containing water component. In short, any kinds of solvents may be used so long as they can vibrate electrons and ions due to actions of magnetic fields.

Further, as mentioned in the above embodiment, the descaling effect of this invention becomes remarkable when the descaled object is the pipe through which the solvent flows, and it is needless to say that the descaled object is not limited to the pipe. Furthermore, it will be clear from the above explanation that the present invention can be applied to a descaled object through which no solvent flows.

The invention claimed is:

1. A method of descaling a scaled surface of an object, the method comprising the steps of:
   covering at least the scaled surface of the object with a solvent;
   forming a magnetic field by supplying a frequency signal to a coil, wherein the frequency signal includes a predetermined frequency corresponding to a specific type of scale on the scaled surface of the object, and wherein the frequency signal is supplied to the coil to selectively remove said specific type of scaling; and
   positioning said object and said solvent within said magnetic field.

2. The method according to claim 1, wherein said method is characterized in that said predetermined frequency is a frequency at which an electric current flowing through said solvent spikes when said frequency signal is supplied to said coil.

3. The method according to claim 1, wherein said method is characterized in that said frequency signal has a frequency lower than a frequency of an ESR (Electron Spin Resonance).

4. The method according to claim 1, wherein said method is characterized in that said solvent flows in the direction extending along the object's scaled surface at an arbitrary velocity, said magnetic field being formed such that magnetic flux crosses the direction in which said solvent flows.

5. The method according to claim 1, wherein said method is characterized in that said predetermined frequency of said frequency signal supplied to said coil is varied within a frequency range having a mid-range frequency corresponding to said specific type of scaling.

6. The method according to claim 1, wherein said method is characterized in that a plurality of frequency signals including a plurality of predetermined frequencies that correspond to a plurality of different types of scale on the scaled surface of the object, are supplied to said coil in a time-division manner to selectively remove said plurality of different types of scaling.

7. The method according to claim 6, wherein said method is characterized in that a length of a time-division period during which a corresponding frequency signal of said plurality of frequency signals is supplied to said coil is set corresponding to a scale component ratio of each type of scale among said plurality of different types of scale to be removed.

8. The method according to claim 1, wherein said method is characterized in that said coil is a duplex winding coil composed of first and second coils, a square wave signal being supplied to said first coil and a sine wave signal being supplied to said second coil.

9. The method according to claim 1, wherein said method is characterized in that said coil is a triplex winding coil composed of first, second and third coils, a square wave signal being supplied to said first coil, a sine wave signal being supplied to said coil and a triangular wave signal being supplied to said third coil.

10. The method according to claim 1, wherein said method is characterized in that said solvent is water.

11. An apparatus for descaling a scaled surface of an object, the scaled surface being covered in solvent, the apparatus comprising:
 a magnetic field generating unit configured to generate a magnetic field that extends through the object and solvent, by supplying a frequency signal to a coil; and
 a frequency signal generating unit configured to generate the frequency signal, wherein said frequency signal includes a predetermined frequency corresponding to a specific type of scale on the scaled surface of the object, and wherein the magnetic field generating unit is configured to supply said frequency signal to said coil to selectively remove said specific type of scaling.

12. The apparatus according to claim 11, wherein said apparatus is characterized in that said frequency signal includes a predetermined frequency at which an electric current flowing through said solvent spikes when said predetermined frequency signal is supplied to said coil.

13. The apparatus according to claim 11, wherein said apparatus is characterized in that said predetermined frequency signal has a frequency lower than a frequency of an ESR (Electron Spin Resonance).

14. The apparatus according to claim 11, wherein said apparatus is characterized in that said solvent flows in the direction extending along the object's scaled surface at an arbitrary velocity, said magnetic field generating unit being configured to form said magnetic field such that magnetic flux crosses the direction in which said solvent flows.

15. The apparatus according to claim 11, wherein said apparatus is characterized in that said frequency signal generating unit is configured to vary a frequency of said predetermined frequency signal supplied to said coil within a frequency range having a mid-range frequency corresponding to said specific type of scaling.

16. The apparatus according to claim 11, wherein said apparatus is characterized in that said frequency signal generating unit includes a selecting unit that is configured to select frequencies of generated frequency signals.

17. The apparatus according to claim 11, wherein said apparatus is characterized in that said frequency signal generating unit includes a selecting unit that is configured to select a plurality of frequencies as frequencies of generated frequency signals; and
 a time-division unit for generating frequency signals with said plurality of selected frequencies in a time-division manner.

18. The apparatus according to claim 17, wherein said apparatus is characterized in that said time-division unit is configured to vary a time-division period during which said plurality of predetermined frequency signals are supplied to said coil.

19. The apparatus according to claim 11, wherein said apparatus is characterized in that said coil in said magnetic field generating unit is a duplex winding coil composed of first and second coils, said frequency signal generating unit is configured to generate a square wave signal and a sine wave signal, and wherein said magnetic field generating unit is configured to supply said square wave signal to said first coil and supply said sine wave signal to said second coil.

20. The apparatus according to claim 11, wherein said apparatus is characterized in that said coil in said magnetic field generating unit is a triplex winding coil composed of first, second and third coils, said frequency signal generating unit is configured to generate a square wave signal, a sine wave signal and a triangular wave signal, wherein said frequency signal generating unit is configured to supply a square wave signal to said first coil, supply a sine wave signal to said second coil and supply a triangular wave signal to said third coil.

21. The apparatus according to claim 11, wherein said apparatus is characterized in that said solvent is water.

* * * * *